United States Patent [19]

Melman et al.

[11] Patent Number: 4,523,843
[45] Date of Patent: Jun. 18, 1985

[54] OPTICAL TEST SET-UP FOR EXPANDED BEAM CONNECTOR

[75] Inventors: Paul Melman, Newton; W. John Carlsen, Boston, both of Mass.

[73] Assignee: GTE Laboratories Incorporated, Waltham, Mass.

[21] Appl. No.: 520,392

[22] Filed: Aug. 4, 1983

[51] Int. Cl.³ .................... G01B 11/26; G02B 7/26
[52] U.S. Cl. ............................. 356/127; 356/73.1; 356/239
[58] Field of Search ................ 356/73.1, 239, 124, 356/125, 127; 350/96.15, 96.18, 96.2

[56] References Cited

U.S. PATENT DOCUMENTS

| | | | |
|---|---|---|---|
| 3,600,098 | 8/1971 | Mohrman | 356/127 |
| 4,215,937 | 8/1980 | Borsuk | 350/96.18 |
| 4,265,511 | 5/1981 | Nicia et al. | 350/96.18 |
| 4,290,667 | 9/1981 | Chown | 350/96.21 |

Primary Examiner—Vincent P. McGraw
Assistant Examiner—S. A. Turner
Attorney, Agent, or Firm—Fred Fisher

[57] ABSTRACT

A nondestructive optical test set-up for measurement of critical parameters of expanded beam connectors which does not require the insertion of fibers into the connector or contact to any critical surface. The method is independent of fiber preparation techniques, assembly procedure, and connector housing accuracy.

8 Claims, 4 Drawing Figures

OPTICAL TEST SET-UP FOR EXPANDED BEAM CONNECTOR

CROSS-REFERENCE TO RELATED APPLICATION

This application relates to a method of testing the accuracy of construction of an optical fiber centering device, which device is more fully described in our co-pending U.S. patent application, Ser. No. 454,943, filed Jan. 3, 1983, entitled "Optical Fiber Centering Device", which application, in turn, is a continuation-in-part of U.S. patent application Ser. No. 223,192, filed Jan. 7, 1981. The said applications are hereby incorporated herein by reference.

BACKGROUND OF THE INVENTION

This invention relates to a method of testing optical fiber centering devices, and, in particular, to a method of testing the accuracy of construction of a molded, integral, transparent, telecentric optical fiber connector body. Accordingly, it is a general object of this invention to provide new and improved methods of such character.

As more fully set forth in our co-pending application Ser. No. 454,943, filed Jan. 3, 1983, there is described an optical fiber centering device for centering the principal axis of an optical fiber along a predetermined axis of the device and for positioning an end of the fiber to a specific location along the predetermined axis, such device including a receiving member and elastomeric insert means. The receiving member has a cylindrical cavity therewithin having an axis of revolution coincident with the predetermined axis. The cylindrical cavity terminates at an interior end surface. The interior end surface contains a truncated conical recess for further centering an end of the optical fiber along the predetermined axis to a degree greater than that achievable in the absence of the recess, such that the following occurs:

(a) All cross-sections through the recess and perpendicular to the predetermined axis are circular with their centers on the said axis;

(b) The size of the cross-section of the recess at the interior end surface of the cylindrical cavity is greater than that of the largest diameter fiber to be centered and positioned;

(c) The size of the cross-sections decreases smoothly and monotonically away from the cylindrical cavity end surface until the recess terminates at a cross-section smaller than that of the smallest diameter fiber to be centered and positioned such that an inserted fiber is guided smoothly along the wall of the recess and is stopped when the cross-sectional dimensions of the recess no longer is greater than the diameter of the inserted fiber; and (d) The depths of the cylindrical cavity and the recess are such that the specific location along the predetermined axis where the one end of the fiber is to be positioned is where the cross-sectional dimensions of the recess permits the nominal dimensions of the fiber to be centered and positioned. The elastomeric insert means is insertable to the cylindrical body, the insert means having an internal passageway. Thus, an optical fiber inserted into the elastomeric insert means causes resulting elastic restoring forces to automatically center the fiber along the predetermined axis.

As stated in that 1983 application, the depth of the truncated conical recess can be 0.015 inch, the recess can terminate at a cross-section of 0.003 inch, the wall of the recess can form an angle of 30° with respect to the predetermined axis, the receiving member can be an integral part of a telecentric optical connector, and the telecentric optical connector can include an integrally molded lens surface whose optical axis coincides with the predetermined axis and whose focal point coincides with the specific location.

The telecentric optical fiber connector, wherein light from an optical fiber is emitted from the connector lens in a comparatively large diameter parallel beam, can be referred to as an expanded beam connector. It includes two primary components: One, an integral, optical quality, plastic connector body having an annular planar reference surface substantially perpendicular to an optical axis. A recessed convex lens surface is molded, inwardly from the reference surface. The body is substantially cylindrical, and is so configured to be engageable with a similar body. The opposite axial end of the body has a central cylindrical cavity therein which extends to a point which is one focal length from the lens surface, the truncated conical recess being located at such point. The second component, a fiber holder, holds an optical fiber centrally within the cavity, and abuts an end of the fiber against that point which is one focal length from the lens surface. Index-matching material can be applied to the end of the fiber.

The expanded beam connector (or receiving part) consists essentially of an integrally formed, fiber alignment part, a collimating lens, and a reference surface. Optimum performance is achieved by locating the fiber on the optical axis with submicron accuracy, thereby minimizing loss. The optical axis is an imaginary line normal to the reference surface drawn through the apex of the lens. The position of the fiber is defined by the conical recess and the fiber axis that coincides with the conical axis. A concern in the mass production by injection molding of such parts is the availability of a production method to measure the departure of the cone axis from the optical axis. A production measurement permits an immediate correction of any deviations, as well as determination of the correct parameters required for molding.

In the past, the development of an expanded beam connector was impeded by the lack of such measurement technique. The development of the expanded beam connector required the measurement of the angle that the collimated beam emerging from the lens makes with respect to the reference surface. Prior art techniques were generally destructive and resulted in long response time. The prior art techniques had their accuracy dependent upon fiber cleave angle, assembly procedure and fiber insertion techniques, thus being unsatisfactory for monitoring a production process. For quality control purposes, the prior art destructive techniques posed serious problems in terms of their suitability for large sampling ratios.

SUMMARY OF THE INVENTION

Another object of this invention is to provide a new and improved nondestructive method of testing the accuracy of construction of a molded, integral, transparent, telecentric optical fiber connector body.

Still another object of this invention is to provide a new and improved method of testing the accuracy of construction of a molded, integral, transparent, telecentric optical fiber connector body, which method can be easily used in a production area.

Yet another object of this invention is to provide a new and improved method of testing the accuracy of construction of a molded, integral, transparent, telecentric optical fiber connector body, which method is accurate and independent of fiber preparation and assembly techniques because the method does not require fiber.

One aspect of the invention is directed to a method of testing the accuracy of construction of a molded, integral, transparent, telecentric optical fiber connector body. The body has an optical axis, a reference surface at one end of the body perpendicular to the axis, a lens surface recessed inwardly from the reference surface to provide a focal point on the axis, a cavity at an opposite end of the body for receiving both an optical fiber and separate means for holding and centering the optical fiber, and a truncated conical indentation recessed inwardly from the cavity. The indentation terminates in a circular flat having a center on or near the focal point. The method includes the steps of placing the reference surface of the body on an optically flat reflector with the reference surface parallel to the reflecting surface of the reflector. The opposite end of the body is illuminated with a noncoherent light source. Light reflected or transmitted from such opposite end is focussed onto an image plane which is provided distant from that opposite end of the body. Thus, illumination from the noncoherent light source is reflected from the circular flat, and focussed on the image plane, whereby a first image is formed thereon. Also, illumination from the noncoherent light source is collimated by the lens surface, reflected from the reflecting surface, focussed by the lens surface to the focal point, and focussed onto the image plane to form a second image thereon. The displacement, if any, of the first image with respect to the second image is measured. In accordance with one feature of the invention, the latter displacement can be lateral; in accordance with another feature, the latter displacement can be axial. In accordance with certain features of the invention, the method can further include the steps of accepting the accuracy of construction of the body when the measured displacement of the images is less than a predetermined quantity, and rejecting the accuracy of construction of the body when the measured displacement of the images is equal to or greater than the predetermined quantity. The light can be monochromatic light; the light can be narrow-band visible light.

In accordance with another aspect of the invention, a method of testing the accuracy of construction of a molded, integral, transparent, telecentric optical fiber connector body is described in which the body has an optical axis, a reference surface at one end of the body perpendicular to the axis, a lens surface recessed inward from the reference surface to provide a focal point on the axis, a cavity at an opposite end of the body for receiving both an optical fiber and separate means for holding and centering the optical fiber, and a truncated conical indentation recessed inwardly from the cavity, the indentation terminating in a circular flat having a center on or near the focal point. The method includes the steps of illuminating the one end of the body with a noncoherent light source, illuminating the lens surface from without the one end of the body with a coherent light source having a beam aligned to be perpendicular to the reference surface. An image plane is provided distant from the opposite end of the body. Light transmitted from the opposite end is focussed onto the image plane, so that illumination from the noncoherent light source illuminates the lens surface along a large range of angles, whereby the truncated conical indentation is illuminated, and an image of the circular flat is transmitted to the image plane. Illumination from the coherent light source is focussed to a small spot at the focal point, and, in turn, is displayed on the image plane at or near the center of the image of the circular flat. The displacement, if any, of the image of the small spot from the center of the image of the circular flat is measured. In accordance with certain features of the invention, the method can further include the steps of accepting the accuracy of construction of the small body when the measured displacement of the image of the small spot from the center of the image of the circular flat is less than a predetermined quantity, and rejecting the accuracy of construction of the body when the measured displacement of the image of the small spot from the center of the image of the circular flat is equal to or greater than the predetermined quantity.

BRIEF DESCRIPTION OF THE DRAWINGS

Other objects, advantages and features of this invention, together with its mode of operation, will become more apparent from the following description, when read in conjunction with the accompanying drawing, in which.

DESCRIPTION OF PREFERRED EMBODIMENT(S)

Figure 1A:
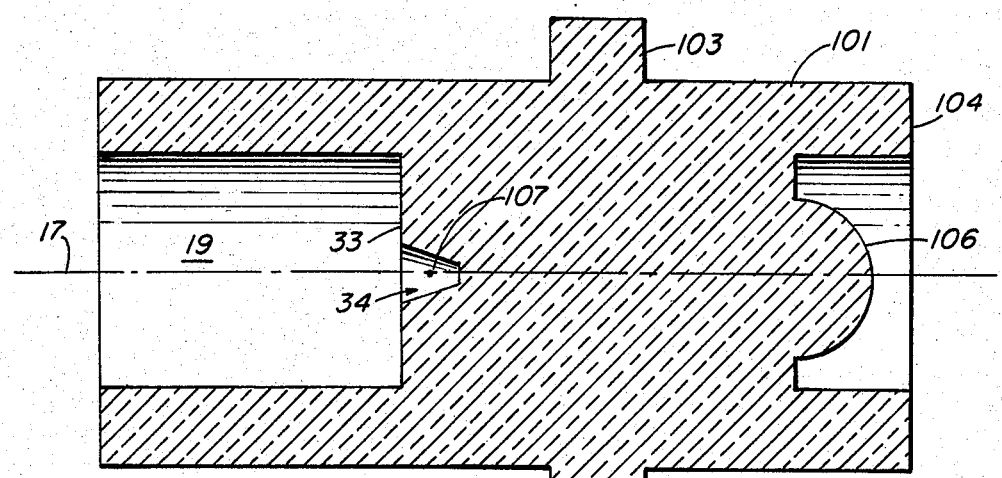
FIG. 1A is a cross-sectional view of an expanded beam connector whose accuracy of construction is to be tested, the connector having a surface of revolution symmetrical about its axis.

FIG. 1A depicts a cross-sectional view of a plastic, molded, telecentric optical connector 101, as described more fully in our co-pending U.S. patent application Ser. No. 06/454,943, filed Jan. 3, 1983. The plastic, molded, telecentric optical connector 101 has a circular flange 102 thereabout, having a flat 103 thereon for alignment purposes.

The plastic, molded, telecentric optical connector 101 has a cylindrical hole 19 which terminates at an internal plane surface 33. The internal plane surface 33 has a depression 34 therewithin which centrally aligns with the axis 17.

The telecentric optical connector 101 is formed of transparent plastic and includes a front reference surface 104 which is adapted to mate with a corresponding reference surface of a similar telecentric connector. A convex lens surface 106 is recessed from the reference surface 104. The focal point 107 lies on the axis 17.

Figure 1B:
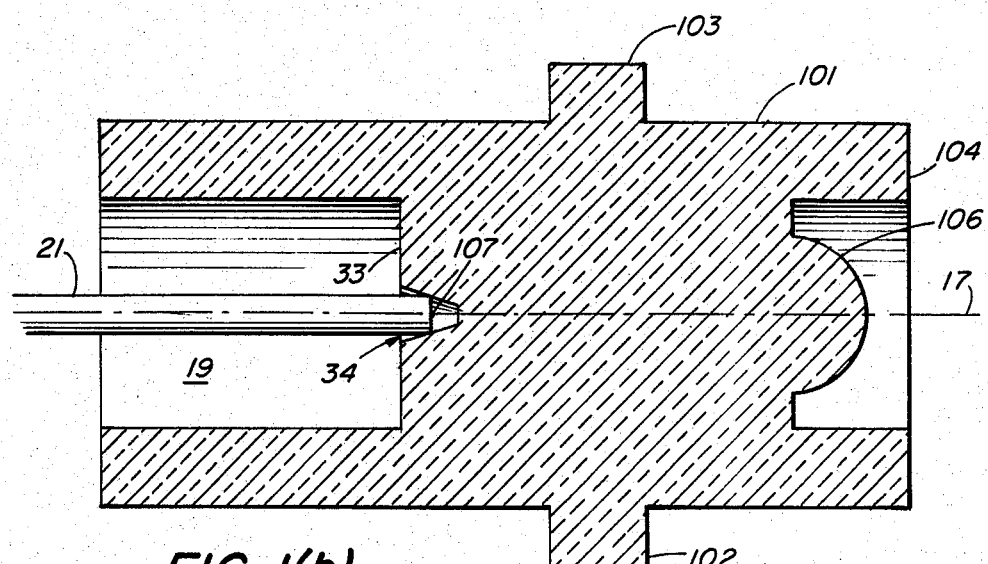
FIG. 1B is a view similar to that shown in FIG. 1A but with an optical fiber included.

An optical fiber 21, as depicted in FIG. 1B, can have a nominal outside diameter of 0.005 inch, the precise dimension of which can vary due to manufacturing tolerances. The plastic, molded, telecentric optical connector 101 contains the depression 34 therewithin and, in a preferred embodiment, the depression 34 is a truncated conical recess as depicted in FIGS. 1A and 1B. Preferably, the depth of such recess is 0.015 inch; the recess 34 terminates at its truncated portion with a cross-section of 0.003 inch; and the wall of the recess 34 forms an angle of 30° with respect to the predetermined axis 17. The walls of the recess 34 are smooth, monotonically decreasing from the end surface 33 to the truncated portion of the recess 34, whereby an optical fiber 21 can be smoothly brought into engagement with the connector 101 so that the end of the fiber 21 engages the walls of the recess, stopping when the cross-sectional dimensions of the recess no longer is greater than the diameter of the inserted fiber 21.

The depth of the cylindrical cavity and the recess is such that the specific location 107 (along which the end of the fiber is to be positioned and centered along the predetermined axis) coincides with the focal point 107 of the lens 106 when the optical fiber 21 has a diameter exactly equal to the nominal diameter of the fiber to be centered and positioned.

Though an actual optical fiber 21 may have a diameter which is slightly different from the nominal diameter, the different specific location to which the end of the fiber would be positioned from the focal point 107 is miniscule, and, for pragmatic purposes, can be ignored.

When using a plastic, molded, telecentric connector 101 having the truncated conical configuration 34, together with the three elastomeric insert means as described in our co-pending application filed Jan. 3, 1983, an optical fiber 21 can be inserted therewithin so that resulting elastic restoring forces automatically center the fiber 21 along the predetermined axis.

As stated hereinabove, the problem existing in the mass production of an expanded beam connector, utilizing injection molding, is the availability of a method to measure, in a production area, the departure of the conical axis from the optical axis. Two different techniques have been developed by us for the measurement of such deviations.

A. Image Comparison Technique

Figure 2:
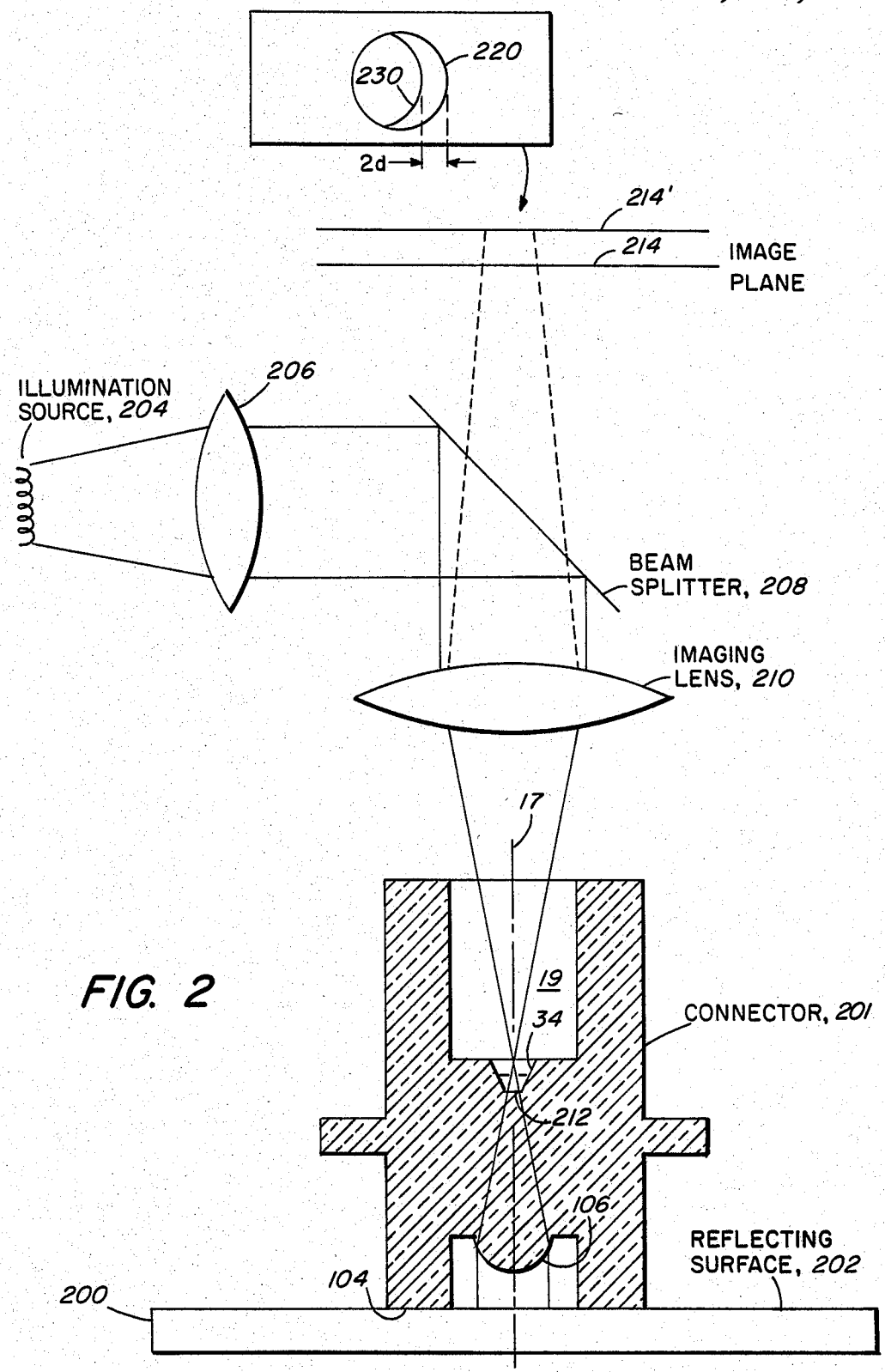
FIG. 2 is a diagram illustrating one method of practicing the invention.

Referring to FIG. 2, the following is a description of a method of testing the accuracy of construction of a molded, integral transparent, telecentric optical fiber connector body 101 having an optical axis 17, a reference surface 104 at one end of the body 101 perpendicular to the axis 17, a lens surface 106 recessed inwardly from the reference surface 104 to provide a focal point 107 on the axis 17, a cavity 19 at an opposite end of the body 101 for receiving both an optical fiber 21 and separate means for holding and centering the optical fiber 21, and a truncated conical indentation 34 recessed inwardly from the cavity 19, the indentation terminating in a circular flat 212 having a center on or near the focal point 107. The method includes placing the reference surface 104 of the body 101 on an optically flat reflector 200 with a reference surface 104 parallel to the reflecting surface 202 of the reflector 200, illuminating the opposite (fiber) end of the body 101 with a noncoherent light source 204 (preferably narrow-band light), and providing an image plane 214 distant from the opposite end of the body 101. Light from the illumination source 204 is transmitted and guided by a first converging lens 206, reflected from a beam splitter 208, through an imaging lens 210, and directed toward the conical flat 212. Part of the light from the conical flat 212 is reflected back through and focussed by the imaging lens 210, through the beam splitter 208, onto an image plane 214, so that illumination from the noncoherent light source 204 is reflected from the circular flat 212 and focussed onto the image plane 214 whereby the first image 220 is formed.

The rest of the light passes through the conical flat indentation 212, whereby the connector 101 and the lens 106 approximately collimate the transmitted light, which transmitted light is reflected by the reflecting surface 202 and imaged by the lens 106 near the conical indentation 212. This image is magnified by the lens 210, through the beam splitter 208, to form another image 230 of the cone flat in a plane parallel to the plane 214 of the first image 220. The distance between these two images is directly related to the distance between the conical flat and the focal plane of the lens 106. Thus, two images 220, 230 are formed by the imaging lens 210. Were the cone flat to be off axis by distance d, the two observed images become shifted with respect to each other by a distance 2d. This technique allows accurate measurement of this offset and benefits from the twofold magnification. Referring again to FIG. 2, shown therewith is an associated detail of reflected and transmitted images 220, 230 that are offset by the distance 2d. The distance between the planes 214, 214' of the two images 220, 230 provides an immediate information about the distance of the fiber end that is inserted into the conical indentation 34 to the focal plane of the lens 106.

B. Center of Distribution Comparison Method

Figure 3:
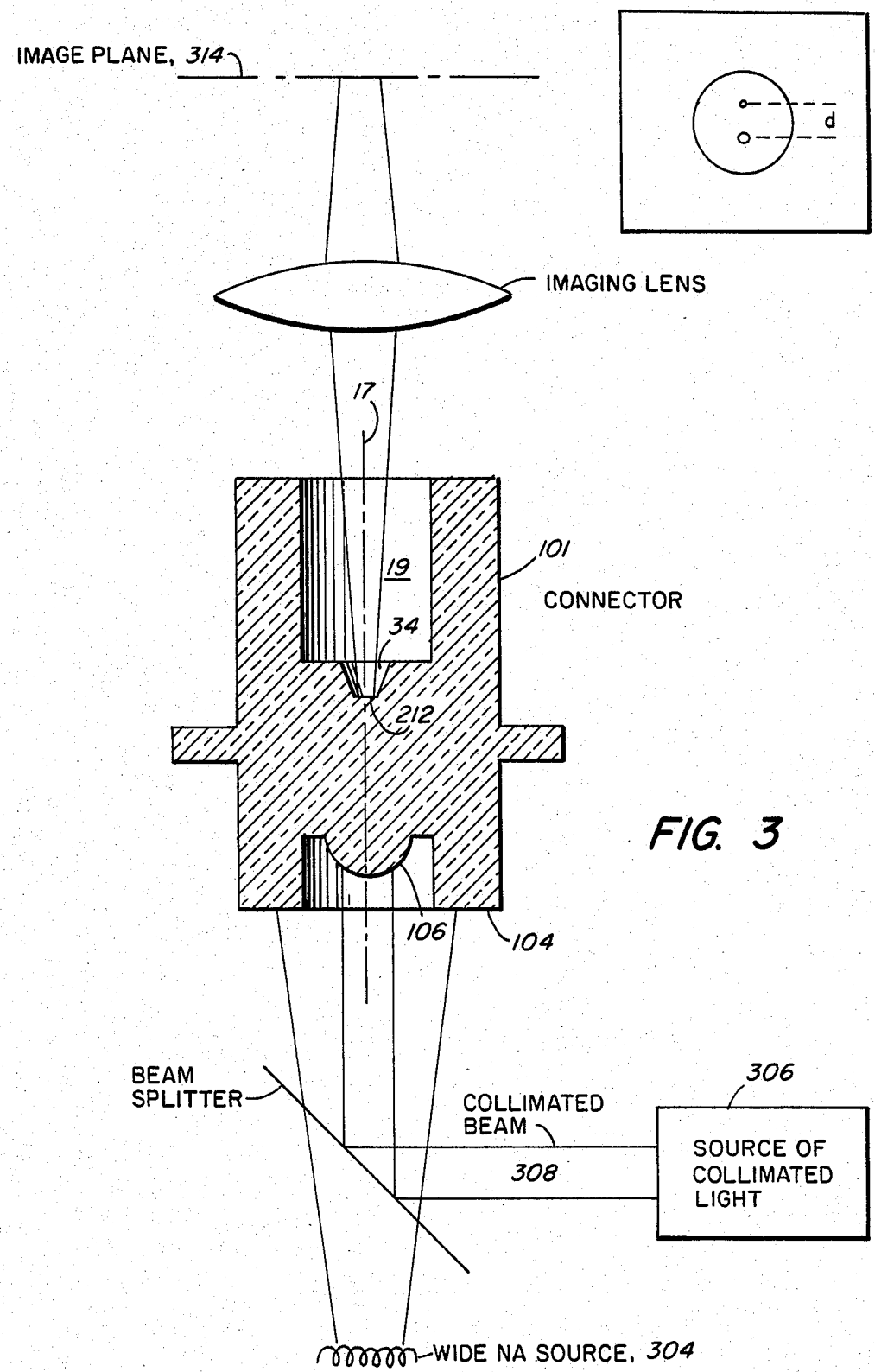
FIG. 3 is a diagram illustrating another method for practicing the invention.

In this technique, referring to FIG. 3, two different light sources are used: a wide numerical aperture source 304 (which is a source of noncollimated light), and a source 306 of collimated light. Both sources 304 and 306 illuminate the connector 101 from the lens 106 side.

One of the light sources 304 is a large numerical aperture lamp; its light illuminates the lens 106 from a large range of angles, and, therefore, the whole fiber aligning cone 34 (including the flat 212) is illuminated. When viewed from the cone side, after magnification, the cone flat 212 and its edges can be clearly observed because light illuminating the cone sides undergoes total internal reflection, and therefore does not reach the image plane 314.

The second light source 306 is a well collimated and preferably monochromatic beam 308. This beam 308 is aligned to be perpendicular to the reference surface 104. The connector lens 106 focuses this beam 308 to a small spot on the cone flat 212. The center of this spot corresponds to the point where the optical axis 17 intersects the cone flat. The discrepancy between this point and the center of the cone flat image created by the large numerical aperture source is the offset distance d as indicated in the detail view associated with FIG. 3.

This foregoing method, as before, relates to testing the accuracy of construction of a molded, integral, transparent, telecentric optical fiber connector body 101 having an optical axis 17, a reference surface 104 at one end of the body 101 perpendicular to the axis 17, a lens surface 106 recessed inwardly from the reference surface 104 to provide a focal point 107 on the axis, a cavity 19 at an opposite end of the body 101 for receiving both an optical fiber 21 and separate means for holding and centering the optical fiber, and a truncated conical indentation 34 recessed inwardly from the cavity, the indentation 34 terminating in a circular flat having a center on or near the focal point 107. This center of distribution comparison method includes the illumination of one end of the body 101 by a noncoherent light source 304. The lens surface 106 is illuminated from without the one end of the body 101 by a coherent light source 306 having a beam 308 aligned to be perpendicular to the reference surface 104. An image plane 314 is provided distant from the opposite end of the body 101. The method further requires the focussing of transmitted light from the opposite end of the connector 101 onto the image plane 314 so that:

(1) illumination from the noncoherent light source 304 illuminates the lens surface 106 along a large range of angles whereby the truncated conical indentation 34 is illuminated and an image of the circular flat 212 is transmitted to the image plane 314; and (2) illumination from the coherent light source 306 is focussed to a small spot at the focal point 107 and, in turn, is displayed on the image plane 314 at or near the center of the image of the circular flat 212.

The displacement, if any, of the image of the small spot from the center of the image of the circular flat can be measured.

When the measured displacement of the image of the small spot from the center of the image of the circular flat is less than a predetermined quantity, the accuracy of construction of the body can be accepted. Correspondingly, when the measured displacement of the image of the small spot from the center of the image of the circular flat is equal to or greater than such predetermined quantity, the body can be rejected.

It will be apparent to those skilled in the art that various modifications can be made without departing from the spirit and scope of this invention. Hence, it is preferred that this invention be limited solely by the scope of the appended claims.

What is claimed is:

1. A method of testing the accuracy of construction of a molded, integral, transparent, telecentric optical fiber connector body having an optical axis, a reference surface at one end of said body perpendicular to said axis, a lens surface recessed inward from said reference surface to provide a focal point on said axis, a cavity at an opposite end of said body for receiving both an optical fiber and separate means for holding and centering said optical fiber, and a truncated conical indentation recessed inwardly from said cavity, said indentation terminating in a circular flat having a center on or near said focal point, said method comprising the steps of
    (a) placing said reference surface of said body on an optically flat reflector with said reference surface parallel to the reflecting surface of said reflector;
    (b) illuminating said opposite end of said body with a noncoherent light source;
    (c) providing an image plane distant from said opposite end of said body;
    (d) focussing light reflected or transmitted from said opposite end onto said image plane, so that
        (1) illumination from said noncoherent light source is reflected from said circular flat, and focussed on said image plane, whereby a first image is formed thereon; and
        (2) illumination from said noncoherent light source is collimated by said lens surface, reflected from said reflecting surface, focussed by said lens surface to said focal point, and focussed onto said image plane to form a second image thereon; and
    (e) measuring the displacement, if any, of said first image with respect to said second image.

2. The method as recited in claim 1 wherein said step (e) comprises measuring the lateral displacement, if any, of said first image with respect to said second image.

3. The method as recited in claim 1 wherein said step (e) comprises measuring the axial displacement, if any, of said first image with respect to said second image.

4. The method as recited in claim 1 further comprising the steps of
    (f) accepting the accuracy of construction of said body when the measured displacement of said images is less than a predetermined quantity; and
    (g) rejecting the accuracy of construction of said body when the measured displacement of said images is equal to or greater than said predetermined quantity.

5. The method as recited in claim 1 wherein said light is monochromatic light.

6. The method as recited in claim 1 wherein said light is narrow-band visible light.

7. A method of testing the accuracy of construction of a molded, integral, transparent, telecentric optical fiber connector body having an optical axis, a reference surface at one end of said body perpendicular to said axis, a lens surface recessed inward from said reference surface to provide a focal point on said axis, a cavity at an opposite end of said body for receiving both an optical fiber and separate means for holding and centering said optical fiber, and a truncated conical indentation recessed inwardly from said cavity, said indentation terminating in a circular flat having a center on or near said focal point, said method comprising the steps of
    (a) illuminating said one end of said body with a noncoherent light source;
    (b) illuminating said lens surface from without said one end of said body with a coherent light source having a beam aligned to be perpendicular to said reference surface;
    (c) providing an image plane distant from said opposite end of said body;
    (d) focussing transmitted light from said opposite end onto said image plane, so that
        (1) illumination from said noncoherent light source illuminates said lens surface along a large range of angles, whereby said truncated conical indentation is illuminated, and an image of said circular flat is transmitted to said image plane; and
        (2) illumination from said coherent light source is focussed to a small spot at said focal point, and, in turn, is displayed on said image plane at or near the center of said image of said circular flat; and
    (e) measuring the displacement, if any, of the image of said small spot from the center of said image of said circular flat.

8. The method as recited in claim 7 further comprising the steps of
    (f) accepting the accuracy of construction of said body when the measured displacement of the image of said small spot from the center of said image of said circular flat is less than a predetermined quantity; and
    (g) rejecting the accuracy of construction of said body when the measured displacement of the image of said small spot from the center of said image of said circular flat is equal to or greater than said predetermined quantity.

* * * * *